US 6,577,584 B1

(12) United States Patent
Milster et al.

(10) Patent No.: US 6,577,584 B1
(45) Date of Patent: Jun. 10, 2003

(54) METHOD AND APPARATUS FOR DETECTING LIGHT FROM A MULTILAYERED OBJECT

(75) Inventors: Thomas D. Milster, Tucson, AZ (US); Kei Shimura, Kanagawa-ken (JP)

(73) Assignees: Arizona Board of Regents on Behalf of the University of Arizona, Tucson, AZ (US); Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/559,095

(22) Filed: Apr. 27, 2000

(51) Int. Cl.[7] .............................................. G11B 7/135
(52) U.S. Cl. ...................................................... 369/118
(58) Field of Search ........................ 369/44.24, 112.22, 369/117, 118

(56) References Cited

U.S. PATENT DOCUMENTS

| 4,841,514 A | * | 6/1989 | Tsuboi et al. |
| 5,272,685 A | * | 12/1993 | Ando |
| 5,600,620 A | * | 2/1997 | Ohguri |
| 5,883,872 A | * | 3/1999 | Kino |

OTHER PUBLICATIONS

Walker et al, "High-frequency enhancement of magneto-optic data storage signals by optical and electronic filtering", Optics Letter, vol. 20, No. 17, Sep. 1, 1995, pp. 1815–1817.

Milster et al, "Pupil-plane filtering for improved signal detection in an optical data-storage system incorporating a solid immersion lens", Optics Letters, vol. 24, No. 9, May 1, 1999, pp. 605–607.

Milster et al, "Mechanism for improving the signal-to-noise ratio in scanning microscopes", Optics Letters, vol. 21, No. 16, Aug. 15, 1996, 1304–1306.

Milster et al, "The Nature of the Coupling Field in Optical Data Storage Using Solid Immersion Lenses", Jpn. J. Appl. Phys., vol. 38 (1999), pp. 1793–1794.

Lee, et al, "Feasibility Study on Near field Optical Memory Using A Catadioptric Optical System", WA4–1/137–139.

Hirota et al, "High Density Phase Change Optical Recording Using a Solid Immersion Lens", SPIE vol. 3401, pp. 34–39, 10/98.

* cited by examiner

Primary Examiner—W. R. Young
(74) Attorney, Agent, or Firm—Oblon, Spivak, McClelland, Maier & Neustadt, P.C.

(57) ABSTRACT

An apparatus and method for reproducing signals from a multi-layer structured recording object wherein a linearly polarized laser beam illuminate the multi-layer structured object, such as a phase change recording medium via an objective lens system having an effective numerical aperture greater than 0.6. A light beam reflective from the object is passed to a filtering mask disposed to receive the reflected light beam. The filtering mask includes a first area that has a first transmissivity and a second area having a second transmissivity different than the first transmissivity. The reflected laser beam passed through the filtering mask is detected to reproduce signals from the recording medium.

19 Claims, 3 Drawing Sheets

METHOD AND APPARATUS FOR DETECTING LIGHT FROM A MULTILAYERED OBJECT

BACKGROUND OF THE INVENTION

1. Field of the Invention

The present invention relates to a signal detection method and an optical system, such as an optical memory, using a multi-layered object.

2. Discussion of the Background

The data density of an optical memory can be increased by decreasing a spot size of a light beam focused onto a recording medium. Since the spot size is inversely proportional to an effective numerical aperture $NA_{EFF}$ of the focusing optics, a larger effective numerical aperture leads to a higher recording density.

Solid Immersion Lens (SIL) technology is expected to increase the data density of an optical memory by increasing an effective numerical aperture $NA_{EFF}$ of an objective lens system. An optical disc apparatus using a half sphere shape of SIL is shown in a reference of K. Hirota et. al., High Density Phase Change Optical Recording Using a Solid Immersion Lens, Proc. SPIE 3401, pp.34–39 (1998). Using an SIL with an objective lens, the apparatus attains three times the effective numerical aperture, compared with a system using a conventional objective lens without SIL.

Another method to obtain a larger effective numerical aperture $NA_{EFF}$ uses a Solid Immersion Mirror (SIM) or a Catadioptric Optical System, such as shown in C. W. Lee et al., Technical Digest of Optical Data Storage Topical Meeting '98, WA4-1, (1998). Also, a larger effective numerical aperture can be obtained by using a combination of lenses as an objective lens, but the effective numerical aperture $NA_{EFF}$ is less than 1 in this case.

In an optical microscope, the larger the effective numerical aperture of its objective lens system, the higher the resolution that can be obtained.

However, a contrast of reproduced signals detected from a multi-layered object or recording medium can be degraded to a unusable level when the objective lens system has a larger effective numerical aperture, typically larger than 0.6. In addition, when SIL or SIM is used, the contrast can sensitively depend on the distance between the recording medium and SIL or SIM, such as shown in T. D. Milster et. al., Jpn. J. Appl. Phys. Vol.38, Part 1, No. 3B, pp.1793–1794 (1999).

A proposal to improve the contrast of reproduced signals is provided by T. D. Milster et. al., Mechanism for Improving the Signal-to-Noise Ratio in Scanning Optical Microscopes, OPTICS LETTERS, Vol. 21, No. 16, pp. 1304–1306(1996). The system uses a shading band in the return path of a scanning optical microscope with effective numerical aperture $NA_{EFF}=0.5$ conventional objective lens in order to increase the signal-to-noise ratio, on the basis of their analysis that shows the noise distribution is concentrated near the center of the pupil. The shading band blocks some of the low frequency signal, whereas it passes the high frequency signal.

SUMMARY OF THE INVENTION

Therefore, an object of the present invention is to provide a signal detection method and apparatus that obtain an improved signal contrast.

Another object of the present invention is to provide a signal detection method and apparatus having a stable signal contrast which is less influenced by the distance between a multi-layered object and an objective lens system having an effective numerical aperture $NA_{EFF}$ greater than 0.6.

These and other objects are achieved according to the present invention by producing new and improved signal detection method using a light from a multi-layer structured object, including focusing a linearly polarized light beam in the multi-layer structured object using an objective lens system having an effective numerical aperture $NA_{EFF}$ greater than 0.6, obtaining a modulated light beam from the multi-layer structured object, providing the modulated light beam to a filtering mask having a first area of a first transmissivity and a second area of a second transmissivity different than the first transmissivity, and detecting the modulated light beam corresponding to at least the first area of the filtering mask.

According to another aspect of the present invention, there is provided a new and improved apparatus for reproducing signals from a multi-layer structured recording medium, including a light source of a linearly polarized light beam, an objective lens system having an effective numerical aperture $NA_{EFF}$ greater than 0.6 and configured to focus the linearly polarized light beam onto the multi-layer structured recording medium, thereby obtaining a light beam modulated by the multi-layer structured recording medium, a filtering mask arranged to receive the modulated light beam and having a first area of a first transmissivity and a second area of a second transmissivity different than the first transmissivity, and an optical detector detecting the reflected light beam corresponding to at least the first area of the filtering mask.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DESCRIPTION OF THE PREFERRED EMBODIMENTS

Figure 1:
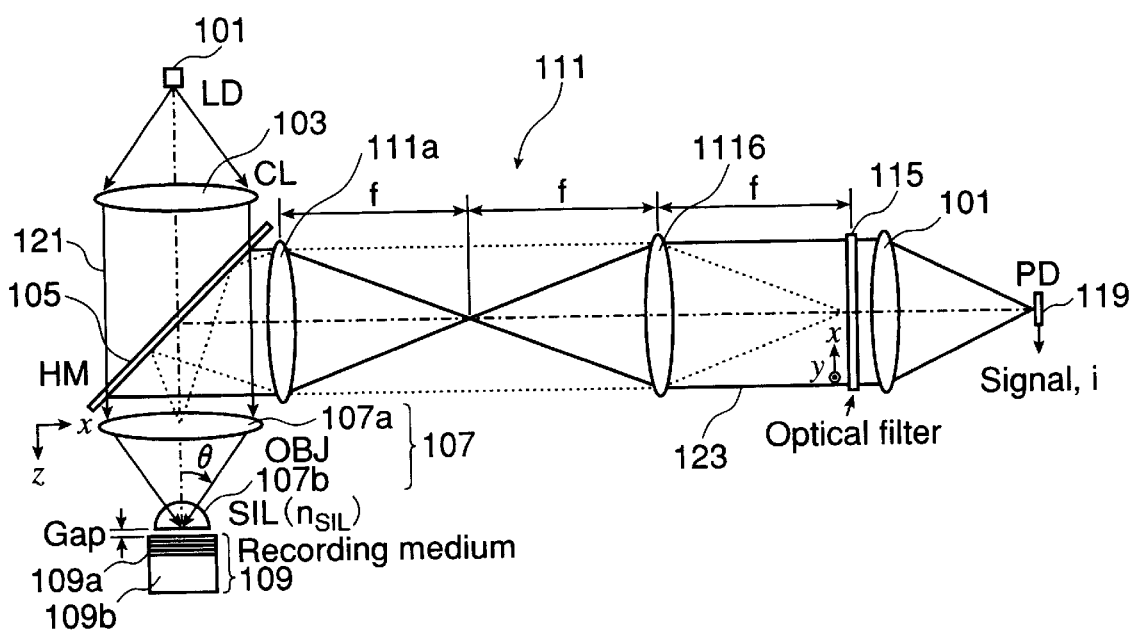
FIG. 1 is a block diagram of an optical disc apparatus in accordance with a preferred embodiment of the present invention.

Referring now to the drawings, wherein like reference numerals designate identical or corresponding parts throughout the several view, and more particularly to FIG. 1 thereof, FIG. 1 is a schematic diagram illustrating an optical disc apparatus for reproducing a signal from a phase change optical disc in accordance with the preferred embodiment of the present invention. The optical disc apparatus includes a light source (LD) 101, a collimator lens (CL) 103, a half mirror (HM) 105, and an objective lens system (OBJ) 107. LD 101 provides a light beam onto a surface of a recording medium 109 in FIG. 1. The light source 101 may be preferably, for example, a semiconductor laser or laser diode to be linearly polarized. In one illustrative embodiment of the present invention, LD 101 produces a linearly polarized laser beam having a wavelength of 650 nanometers. The light beam emitted from the source 101 is transformed into a parallel beam by the collimator lens 103 and passes through a beam splitter or a half mirror 105 and the objective lens system 107. It is noted that the light beam passed through the half mirror 105 is linearly polarized in X direction shown in FIG. 1 and incident into the objective lens system 107.

The objective lens system 107 includes a conventional objective lens 107a and a hemisphere shaped solid immersion lens (SIL) 107b. The objective lens system 107 forms a beam spot on the recording medium 109. In an illustrative embodiment, the numerical aperture $NA_{OBJ}$ of the lens 107a is 0.6 and the refractive index $n_{SIL}$ of the SIL 107b is 1.84. Thus, the effective numerical aperture ($NA_{EFF}$), which is defined by $NA_{EFF}=n_{SIL}\times\sin\theta$ where $\theta$ is the incident angle of a marginal ray, is 1.1.

The bottom face of the SIL 107b is spaced apart about 100 nanometers from the surface of the recording medium 109. The recording medium 109 includes a multi-layered structure 109a and a substrate 109b. The recording medium 109 may be a phase change recording medium wherein the multi-layered structure 109a is a stack of optical thin film layers. The multi-layered structure 109a is formed on a substrate 109b, such as a glass. In this preferred embodiment, the layered structure 109a is a four-layer structure having a $ZnS$—$SiO_2$ dielectric layer facing the SIL 107b with a refractive index of 2.15 and a thickness of 90 nanometers, a GeSbTe phase change medium layer with refractive indices of 4.2+4.2i(crystalline state) and 4.4+2.1i (amorphous state), and a thickness of 19 nanometers, a $ZnS$—$SiO_2$ dielectric layer having the refractive index of 2.15 and a thickness of 16 nanometers, and an Al reflection layer on the substrate 109b with a refractive index of 1.2+5.8i and a thickness of 150 nanometers.

The beam reflected from the recording medium 109 is gathered and transformed into a parallel beam by the SIL 107b and the objective lens 107a and directed to the half mirror 105. The optical disc apparatus also includes a filtering optical system 111, a filtering mask 115, a convergent lens 117, and an optical detector 119. The filtering optical system 111 includes first and second lenses 111a and 111b, respectively. The reflected beam from the half mirror 105 is directed to the optical detector 119 through the filtering optical system 111, the filtering mask 115 and the convergent lens 117. The filtering optical system 111 is a 4-f optical system, forming an image of a pupil plane of the objective lens system 107 on the filtering mask 115.

Figure 2:
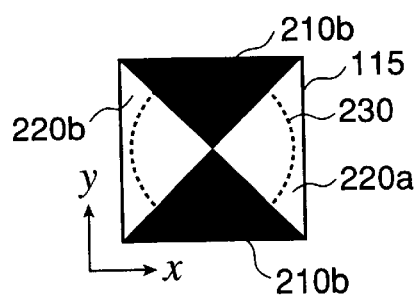
FIG. 2 is a pictorial view of a filtering mask of the optical disc apparatus of FIG. 1.

FIG. 2 is a pictorial view of the filtering mask 115 in accordance with the preferred embodiment of the present invention. The filtering mask 115 has a pair of light transmitting areas 220a and 220b wherein incident light beam passes through, and a pair of non-transmitting areas 210a and 210b wherein incident light beam is substantially blocked to pass through, i.e. reflected, absorbed and/or deflected. Each area is tapered to the center of the plane and divided by two lines perpendicular to each other and crossed at the center of the plane. A dotted circle 230 illustrates the size of an incident light beam onto the filtering mask 115.

The light beam passed through the filtering mask 115 is detected and photoelectrically converted into a reproduced signal by the optical detector 119.

Figure 3:
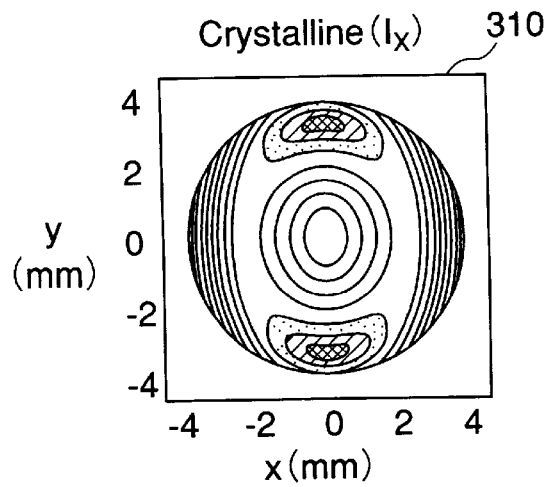
FIGS. 3a, 3(b) and 3(c) are graphs of calculated distributions of the reflected light from a recording medium according to the present invention.
Figure 3:
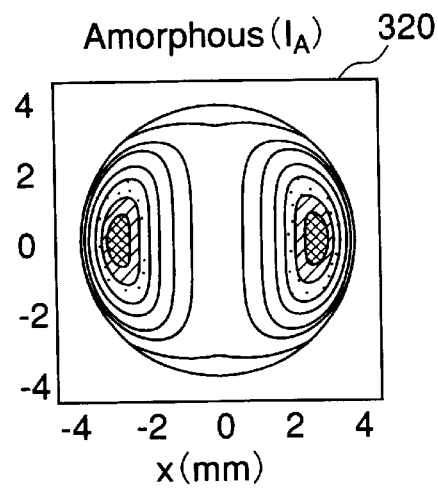
Figure 3:
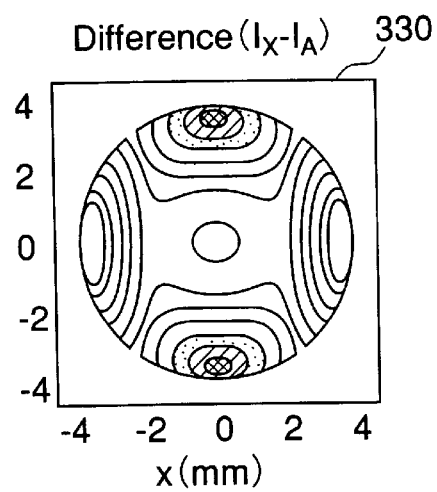

FIGS. 3(a) and 3(b) show the calculated irradiance distributions 310, 320 of the reflected light in the pupil of the objective lens system(also at the filtering mask 115) for 4 layered phase change recording medium 109 in a crystalline state (Ix), an amorphous state (Ia), respectively. FIG. 3(c) shows the difference distribution(Ix–Ia) obtained by subtracting irradiance distribution of FIG. 3(b) from FIG. 3(a).

The irradiance distributions 310 and 320 are confirmed by experimental results observed by a charge coupled device (CCD) camera in the pupil plane of the objective lens system 107. The difference distribution in FIG. 3(c) has both positive and negative components that effectively cancel each other when the integration over the pupil is calculated without the mask.

Such irradiance distributions of the reflected light from a crystalline state and an amorphous state are determined by the light reflection characteristic of a multi-layered medium which depends upon the incident angle and the polarization of the incident light. The center of the pupil corresponds to a light that is incident on the phase change medium normally (i.e. at an incident angle of 0 degree), while the circumferential area of the pupil corresponds to a light that is incident at a large angle to the medium. Therefore, the irradiance of reflected light depends on the radial distance from the center. Specifically, in the circumferential area where the distance from the center of the pupil is approximately more than half the radius of the pupil in FIG. 3, that is, the area having a converted value from an incident angle into an effective numerical aperture being greater than 0.6, the reflection coefficient is greatly different from that for the normally incident light to the medium. According to the embodiment, the polarization direction of the incident light on the medium corresponding to each point of the pupil plane depends on the position of the point in the pupil plane, since the embodiment uses a light beam linearly polarized in the x-direction, the horizontal direction in FIGS. 3(a) and 3(b), as the incident beam on the objective lens system. For example, each point on the x-axis of the pupil plane corresponds to a p-polarized incident light on them medium, while each point of the y-axis of the pupil plane corresponds to a s-polarized incident light. Thus, the irradiance distributions of the reflected light on the x-axis are different from that on the y-axis in FIGS. 3(a)and 3(b).

FIG. 3(c) clearly indicates that the irradiance distribution of the reflected light also depends on the state(crystalline or amorphous) of the phase change medium. For example, the reflected light from the crystalline state area is stronger than that from the amorphous state area for p-polarized light (on x-axis), and the reflected light from the amorphous state area is stronger than that from the crystalline state for s-polarized light (on y-axis). Thus, there are areas having positive value along with the x-axis and areas having negative value along with the y-axis in the difference distribution 330 of FIG. 3(c). Further, the gap between the phase change medium and the SIL also influences the reflection characteristic, since the gap functions as an optical thin film layer additional to the multi-layer structure.

In a conventional phase change optical disc apparatus without the above filtering mask, only an integrated (total) amount of the distribution is detected for obtaining an output signal. Since the integrated amount of the distribution from the crystalline state area is very close to the integrated amount of the distribution from the amorphous state area, it is difficult to identify the signal levels. Using the combination of a polarized incident light and a filtering mask reduces the integration problem. When a linearly polarized incident light is used, a filtering mask is preferably configured to have a selective light transmissivity with a light transparent region corresponding to the area wherein the difference distribution shows positive values and a light non-transparent region corresponding to the area wherein the difference distribution shows negative values. Thus, a signal level from a crystalline state and a signal level from an amorphous state in a phase change medium according to the embodiment can easily be identified.

Figure 4:
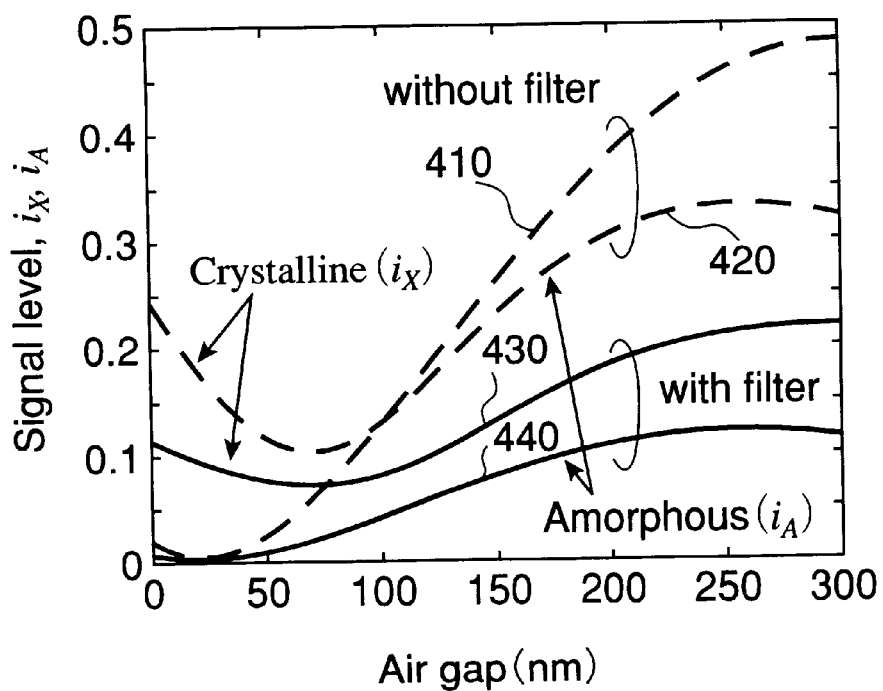
FIG. 4 is a graph illustrating calculated signal levels in the embodiment of the present invention as a function of varying distances between an objective lens and a recording medium, compared with those in the conventional optical system.

FIG. 4 shows calculated reproduced signals obtained from the irradiance distribution of reflected light with changing air gap between the SIL 107*b* and the recording medium 109, wherein the term "$i_x$" represents reproduced signals 410, 430 from a crystalline state area and the term "$i_a$" represents reproduced signals 420, 430 from an amorphous state area. The broken lines 410, 420 show reproduced signals without the filtering mask as in a conventional system and the solid lines 430, 440 show reproduced signals with the filtering mask 115 according to the embodiment.

The level of reproduced signals varies with the distance of the air gap. The difference between the signal level from the crystalline state area and that from the amorphous state area is very small in the conventional system. It is difficult to identify them, especially at the distance of around 100 nanometers, when the filtering mask 115 is not used. However, stable and larger signal difference is obtained at the gap from 0 to 300 nanometers according to the embodiment with the filtering mask 115.

Figure 5:
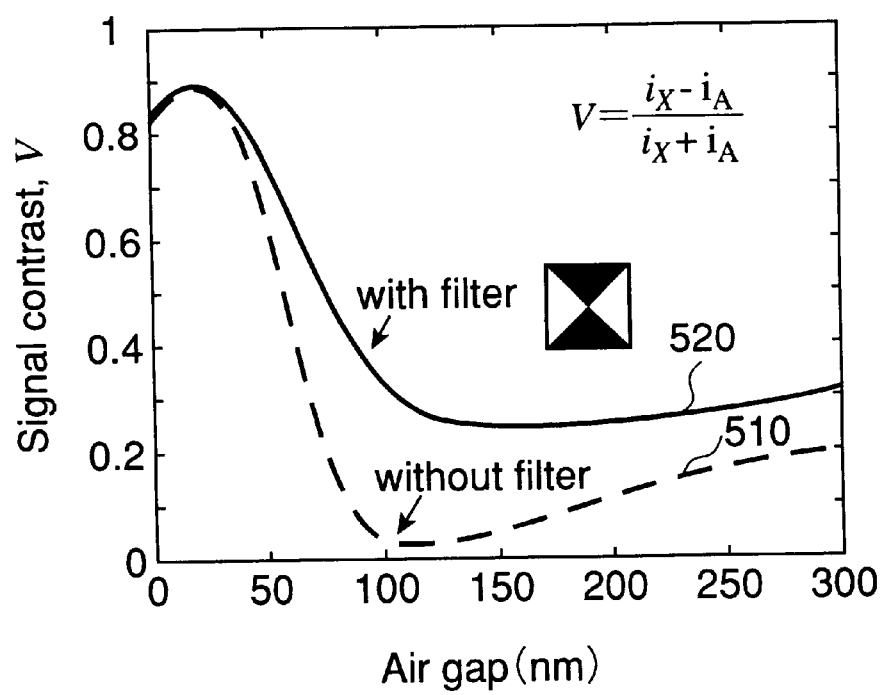
FIG. 5 is a graph illustrating calculated signal contrasts in the embodiment of the present invention as a function of varying distances between an objective lens and a recording medium, compared with those in the conventional optical system.

FIG. 5 shows signal contrasts calculated from the reproduced signals above, changing the air gap between the SIL 107*b* and the recording medium 109. The contrast V is defined as $$V=(i_x-i_a)/(i_x+i_a)$$

The broken line 510 represents a contrast without the filtering mask 115 and the solid line 520 represents a contrast with the filtering mask 115. The line 510 shows the contrast is very small at the gap of 100 nanometers without the filtering mask. The line 520 shows improved contrast over 0.2 according to the embodiment. It is also noted that the contrast is stable, independent from changes in the air gap between the SIL and the medium. Thus, the signal detection characteristic of the system with multi-layer structured medium and an objective optical system having a large effective numerical aperture can be improved according to the preferred embodiment.

Although the above embodiment uses an SIL in the objective optical system (preferably having its effective numerical aperture being greater than 1.0), an objective optical system using a SIM and/or an objective optical system without SIL when its effective numerical aperture is greater than 0.6 can also be used. It is also available for any multi-layer structured medium or specimen, including magneto-optical recording medium, wherein different distributions of reflected light appear on a filtering plane.

Other variations are also possible. For example, the filtering mask 115 may be a phase mask or a complex amplitude mask that can modulate both the phase and the amplitude of the incident light rather than a simple amplitude mask. Furthermore, the filtering mask may be a polarization sensitive amplitude and phase element such as an element including liquid crystal material. The filtering optical systems 111 may be eliminated and the filtering mask 115 disposed just behind the half mirror 105. Also, the filtering mask 115 may be disposed just in front of the detector 119 in this arrangement. Further, the optical detector 119 may be replaced by a differential detection system such as receiving first signals from the non-transparent areas 210*a*, 210*b* and also receiving second signals from the light transparent areas 220*a*, 220*b*, thereby obtaining a difference of these first and second signals, or obtaining the produced signal by using either one of first and second signals. The preferred embodiment uses a reflected light from the multi-layer structured object, but a transmitted light from the multi-layer structured object may be used. The present invention is also applicable to a microscope using a coherent or incoherent light for observing a multi-layer structured specimen.

Numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A signal detecting method using a light from a multi-layer structured object, comprising:

irradiating a linearly polarized light beam on a objective lens system having an effective numerical aperture greater than 0.6;

focusing the linearly polarized light beam on the multi-layer structured object;

obtaining a modulated light beam from the multi-layer structured object;

providing the modulated light beam onto a filtering mask at a pupil plane of the multi-layer structural object, said filtering mask having a first area of a first transmissivity and a second area of a second transmissivity different than said first transmissivity in an area radially tangent to the first area; and detecting the modulated light beam corresponding to at least the first area of the filtering mask.

2. The method according to claim 1, wherein one of the first and second areas of the filtering mask passes the modulated light beam and the other of the first and second areas of the filtering mask does not pass the modulated light beam.

3. An apparatus for reproducing signals from a multi-layer structured recording medium, comprising:

a light source of a linearly polarized light beam;

an objective lens system having an effective numerical aperture greater than 0.6 and configured to focus the linearly polarized light beam onto the multi-layer structured recording medium, thereby obtaining a reflected light beam from the multi-layer structured recording medium;

a filtering mask arranged to receive the reflected light beam at a pupil plane of the multi-layer structured recording medium, said filtering mask having a first area of a first transmissivity and a second area of a second transmissivity different than the first transmissivity in an area radially tangent to the first area; and an optical detector configured to detect the reflected light beam corresponding to at least the first area of the filtering mask.

4. The apparatus according to claim 3, wherein the objective lens system comprises a solid immersion lens facing the multi-layer structured recording medium with a gap.

5. The apparatus according to claim 4, wherein the multi-layered structured recording medium is a phase change recording medium having a crystalline state region and an amorphous state region.

6. The apparatus according to claim 5, wherein the first area of the filtering mask corresponds to an area where irradiance of reflected light beam from the crystalline state region of the phase change recording medium is greater than that of reflected light beam from the amorphous state region of the phase change recording medium or the area where irradiance of reflected light beam from the crystalline state region of the phase change recording medium is smaller than that of reflected light beam from the amorphous state region of the phase change recording medium.

7. The apparatus according to claim 6, wherein each of the first and second areas has two separated sub-areas, each sub-area being divided by two lines perpendicular to each other and crossed at the center of the filtering mask.

8. The apparatus according to claim 3, wherein the filtering mask has at least four areas divided into first and second groups by two lines perpendicular to each other and crossed at the center of the effective aperture of the filtering mask, the lines making an angle of approximately 45 degrees with a projected direction of the polarization of the light incident onto the objective optical system, the first group of said at least four areas corresponding to one set of two areas that are located symmetrically with respect to each other against the crossing point of the lines and the second group of said at least four areas corresponding to the other set of the areas.

9. An apparatus for reproducing signals from a phase change recording medium having a first region in an amorphous state and a second region in a crystalline state, comprising:

a light source of linearly polarized light beam;

a collimating lens system collimating the light beam;

a beam splitter to pass the collimated light beam;

an objective lens system configured to irradiate the linearly polarized light beam onto the phase change recording medium, thereby obtaining a reflected light beam from the recording medium, said objective lens system including a solid immersion lens and having an effective numerical aperture above 0.6;

a filtering mask arranged to receive the reflected laser beam from the phase change recording medium through the beam splitter and at a pupil plane of the phase change recording medium, said filtering mask configured to selectively pass a part of the reflected laser beam, said filtering mask having a first area configured to pass the reflected laser beam from the phase change recording medium and a second area in an area radially tangent to the first area configured to prohibit the passing of the reflected laser beam from the phase change recording medium; and an optical detector configured to detect the reflected laser beam selectively passed by the filtering mask.

10. The apparatus according to claim 9, wherein the phase change recording medium has at least four layers and a distance of the solid immersion lens of the objective lens system to the phase change recording medium is less than 300 nanometers.

11. The apparatus according to claim 10, further comprising a filtering optical system which forms an image of a pupil plane of the objective lens system onto a plane of the filtering mask.

12. The apparatus according to claim 9, wherein the second area of the filtering mask is an area where the reflected laser beam from the phase change recording medium is reflected.

13. The apparatus according to claim 9, wherein the second area of the filtering mask is an area where the reflected laser beam from the phase change recording medium is absorbed.

14. The apparatus according to claim 9, wherein the filtering mask has at least four areas divided into first and second groups by two lines perpendicular to each other and crossed at the center of the effective aperture of the filtering mask, the lines making an angle of approximately 45 degrees with the projected direction of the polarization of the light incident onto the objective optical system, the first group of said at least four areas corresponding to one set of two areas that are located symmetrically with respect to each other against the crossing point of the lines and the second group of said at least four areas corresponding to the other set of the areas.

15. The apparatus according to claim 9, wherein the filtering mask substantially covers the size of the reflected light beam, the first area of the filtering mask including first and second substantially taper shaped sub-areas, the second area of the filtering mask including third and fourth substantially taper shaped sub-areas, the first and second sub-areas being separated by the third and fourth sub-areas.

16. The apparatus according to claim 9, wherein the effective numerical aperture of the objective lens system is greater than 1.0.

17. A signal detecting method using a reflected light from a multi-layer structured object, comprising:

emitting a linearly polarized light beam;

irradiating the light beam on the multi-layer structured object by an objective lens system having an effective numerical aperture greater than 0.6;

obtaining a reflected light beam from the multi-layer structured object;

filtering the reflected light beam by a filtering mask at a pupil plane of a multi-layer structured object, said filtering mask having a first area with a first transmissivity and a second area with a second transmissivity, said first transmissivity being greater than the second transmissivity in an area radially tangent to the first area; and detecting the filtered reflected light beam and generating an output signal.

18. The method according to claim 17, wherein the first area passes through the reflected light beam, while the second area blocks the reflected light beam to pass through.

19. The method according to claim 17, wherein the effective numerical aperture of the objective lens system is greater than 1.0.

* * * * *